J. BECKER.
APPARATUS AND PROCESS FOR THE RECOVERY OF AMMONIUM SULFATE.
APPLICATION FILED JUNE 18, 1917.
1,366,111. Patented Jan. 18, 1921.
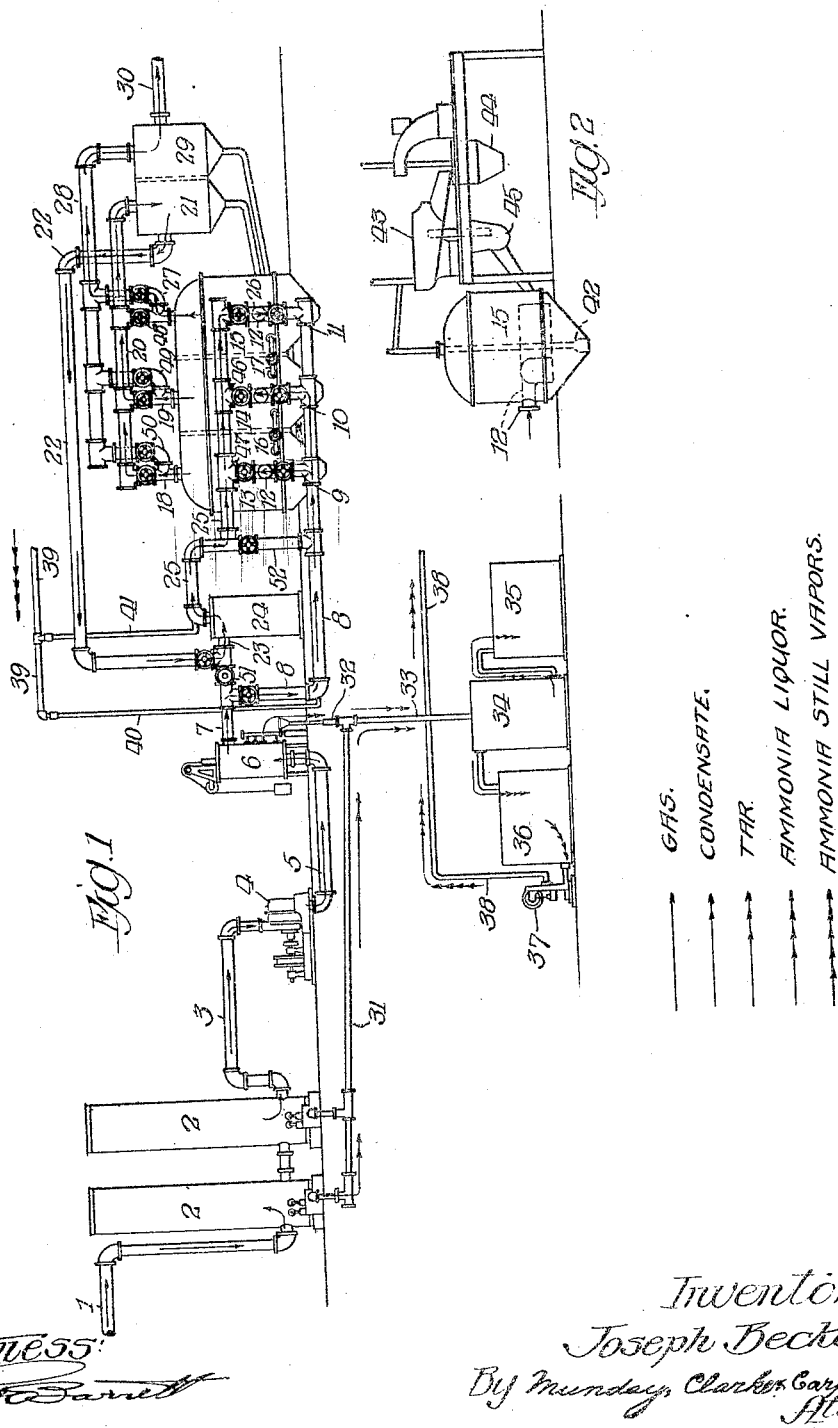

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

APPARATUS AND PROCESS FOR THE RECOVERY OF AMMONIUM SULFATE.

1,366,111. Specification of Letters Patent. Patented Jan. 18, 1921.

Application filed June 18, 1917. Serial No. 175,321.

*To all whom it may concern:*

Be it known that I, JOSEPH BECKER, a citizen of the United States, residing at Pittsburgh, in the county of Allegheny and State of Pennsylvania, have invented a new and useful Improvement in Apparatus and Processes for the Recovery of Ammonium Sulfate, of which the following is a specification.

This invention relates to the recovery of ammonia in form of ammonium sulfate, and more particularly concerns apparatus and processes for effecting such recovery from ammoniacal gases from by-product ovens or gas works. The invention includes among its objects an increasing of the efficiency of such apparatus and processes, an improved method of absorption of ammonia from the gases, a prevention of incrustations within the saturator or salting up the cracker pipes in the saturation baths, and such other improvements or advantages in construction and operation as are found to obtain in the devices and methods hereinafter described or claimed.

In the accompanying drawings, forming a part of this specification, and showing, for the purposes of illustration, a preferred form and manner in which the invention may be embodied and practised, without limiting the claimed invention specifically to such illustrative instance:—

Figure 1 is an elevation and partly diagrammatic illustration of the general arrangement and functioning of an apparatus embodying and employing the invention, for the recovery of ammonium sulfate from ammoniacal gases from coke or gas ovens;

Fig. 2 is an elevational view, taken transversely of Fig. 1, to show more particularly the arrangement of one of the saturator-compartments and the apparatus for extracting and receiving the ammonium sulfate therefrom. Like reference numerals indicate like parts in the above figures.

The ammoniacal gas from the ovens is led through the conduit 1 into the coolers 2, through which it is drawn into a conduit 3 leading into the gas-exhauster 4, from which it passes on through the conduit 5 into the tar-extractor 6. From the tar-extractor the gas, moist and cooled, passes through the outlet pipe 7 into the extension pipe 8 and thence through two of the several branch pipes 9, 10 and 11 that lead from such pipe 8 directly into the cracker-pipes 12 in the respective saturator-compartments 13, 14 and 15. These compartments are in mutual communication, for the overflow and interchange of the respective portions of the saturation-bath, through the connecting ducts 16 and 17. This moist gas discharged through the cracker-pipes into the portions of the saturation-bath within the saturator-compartments 13 and 14, gives up its ammonia through the absorption thereof by such portions of the saturation-bath, with relatively limited formation of ammonium sulfate and without appreciable incrustation within the saturator or tending to the salting up of the cracker-pipes through which said gas flows. From these saturator-compartments 13 and 14 the ammonia-freed gas flows through the respective outlet pipes 18 and 19 into the collecting pipe 20 leading into the acid-separator compartment 21, and thence passes through the pipe 22 into the inlet pipe 23 leading into the preheater 24. From this preheater the superheated ammonia-freed gas is carried through the pipe 25 and its branch-pipe 26 leading into the cracker-pipe within the other saturator-compartment 15, and there supplies the heat needed to effect the requisite evaporation and consequent precipitation of the ammonium sulfate from the saturation-bath. From this saturator-compartment 15 the gas passes on through the outlet pipe 27 into the other collecting pipe 28 leading into the other compartment 29 of the acid-separator, and then flows through the pipe 30 to the gas holder. By reason of the relatively moist or non-superheated condition of the gas flowing through the saturator-compartments 13, 14, and the relatively dry or superheated condition of the gas flowing through the saturator compartment 15, as aforesaid, the level of the portion of the saturator-bath that is in said compartment 15 will tend to be lower than the level of the portions of said bath that are in the compartments 13 and 14, and so there will be maintained a compensating flow from compartment 14 into compartment 15, through the connecting duct 17, and from compartment 13 into compartment 14, through the connecting duct 16, preserving a uniform level for the saturation bath in the three compartments, which are partitioned from each other (as indicated in Fig. 1) but intercommunicate through the said ducts 16 and 17. There may also be some intermittent reverse flow through these ducts, by reason of the more vigorous ebullition of the saturator-bath in compartment 15, and this also results in promoting interchange of solution between the several compartments. The compartment 15, in which much the most active evaporation is being maintained, by the current of ammonia-freed superheated gas flowing through such compartment, is thus fed with ammonia-charged liquor from the compartments 14 and 13, and much the most active deposition of ammonia-sulfate goes on in this compartment 15, although there may be some deposition of sulfate in the other compartments of the compound saturator.

The condensate from the aforesaid coolers 2 and from the tar-extractor 6 flows through the drain pipes 31, 32 and 33 into the separating tank 34, from which the tar is drawn off into the tar-storage tank 35 and the ammonia-liquor flows off into the ammonia-liquor storage tank 36. From the latter the ammonia-liquor is drawn by the pump 37 and forced through the pipe 38 leading to the ammonia still. The ammonia vapor from the ammonia still passes through the main pipe 39 and branch pipe 40 and is discharged into the before-mentioned gas current flowing through the pipe 8. There is also provided a branch pipe 41 through which ammonia vapor from the main pipe 39 may be discharged into the gas flowing through the pipe leading off from the above-mentioned preheater.

Each saturator-compartment is provided with a salt-ejector 42, by which the precipitated ammonium sulfate is ejected and discharged upon the drain-table 43, from which it passes to the drier 44, after draining into the drip pan 45 that leads back into the saturation-bath within the saturator-compartments.

The aforesaid branch pipes 9, 10 and 11, leading respectively into the saturator-compartments 13, 14 and 15, are provided with valves whereby any one or more of said branch pipes may be opened to or shut-off from communication with the corresponding saturator - compartment or compartments. Also, the aforesaid pipe 25 is provided with not only the aforesaid branch pipe 26 leading into saturator-compartment 15 but also branch pipes 46 and 47 leading respectively into saturator-compartments 14 and 13; and the said branch pipes 26, 46 and 47 are provided with valves whereby any one or more of such branch pipes may be opened or shut-off from communication with the corresponding saturator-compartments. Also, the aforesaid collecting pipe 20 is provided with not only the aforesaid branch pipes 18 and 19 serving respectively as outlets from saturator-compartments 13 and 14 but also with branch pipe 48 serving as an outlet from saturator-compartment 15; and the said branch pipes 18, 19 and 48 are provided with valves whereby any one or more of them may be opened or shut-off from communication with the said collecting pipe 20. Also, the aforesaid other collecting pipe 28 is provided with not only branch pipe 27 leading off from saturator-compartment 15 but also branch pipes 49 and 50 leading off respectively from saturator - compartments 14 and 13; and the said branch pipes 27, 49 and 50 are provided with valves whereby any one or more of them may be opened to or shut-off from communication with the said collecting pipe 28. By means of this system of valve-controlled branch pipes, for the said main pipes 8, 25, 20 and 28, the several saturator-compartments may be interchangeably employed for the absorption of ammonia from the ammoniacal gas from main pipe 8 and for the heating effected by the ammonia-freed gas, from main pipe 25, to cause the evaporation requisite to effect precipitation of ammonium sulfate in the saturation-bath.

Several valve-controlled by-passes are also provided to permit, at will, the flowing of all or a portion of the gas in other courses, as follows:—A by-pass pipe 51, controlled by a valve, may be employed to permit the gas to flow directly from the outlet pipe 7 of the tar-extractor into the preheater 24, and thence out through the pipe 25 leading to the saturator-compartments; and when all or a part of the gas follows this course, either or both of the aforesaid main pipes 8 and 22 may be entirely or partly shut-off by their respective valves located adjacent to said by-pass pipe 51. There is also a valve-controlled by-pass pipe 52 connecting the aforesaid main pipes 8 and 25, whereby all or a part of the gas from either of said pipes may be led into the other, with corresponding accommodation, of such change of flow, by adjustment of the valves on the aforesaid branch pipes that respectively lead, from said main pipes 8 and 25, into the saturator-compartments. These by-pass arrangements permit the system to be operated either entirely or partially in accordance with the methods set forth in preceding paragraphs, or to be operated in such manner as to pass all of the ammoniacal gas through the preheater and thence to one or more of the saturator-compartments, without returning any of the ammonia-freed gas to the preheater; and thus great flexibility of operation and adjustment of the system is made possible.

The invention may be embodied or practised in apparatus and ways differing from the apparatus and processes hereinabove particularly described for purposes of illustration, and still be within the scope of the claims hereinafter made.

I claim:

1. In the recovery of ammonium sulfate: the process of first directly passing the tar-freed moist gas through a portion of the saturation-bath, to effect absorption of the ammonia from such gas, and then superheating such ammonia-freed gas and passing it through another portion of the saturation-bath to cause the evaporation requisite to effect precipitation of the ammonium sulfate; substantially as specified.

2. In apparatus for the recovery of ammonium sulfate, in combination: a saturator having a plurality of communicating compartments to contain the saturation-bath; a tar-extractor and connections through which the tar-freed moist gas flows directly into a compartment of the saturator, to effect absorption of ammonia from such gas; and a preheater and connections, whereby the gas flowing from the said compartment of the saturator is superheated and carried to another compartment of said saturator, to cause the evaporation requisite to effect precipitation of ammonium sulfate; substantially as specified.

3. In the recovery of ammonium sulfate: the process of directly passing the tar-freed moist gas through a portion of the saturation-bath, to effect absorption of the ammonia from such gas, and heating by a portion of such gas another portion of the saturation-bath to cause the evaporation requisite to effect precipitation of the ammonium sulfate; substantially as specified.

4. In apparatus for the recovery of ammonium sulfate, in combination: a saturator having a plurality of communicating compartments to contain the saturation-bath; a tar-extractor and connections through which the tar-freed moist gas flows directly into a compartment of the saturator, to effect absorption of ammonia from such gas; and means for heating by a portion of such gas another compartment of the saturator, to cause the evaporation requisite to effect precipitation of ammonium sulfate; substantially as specified.

5. In apparatus for the recovery of ammonium sulfate, in combination: a saturator having a plurality of communicating compartments to contain the saturation-bath; a tar-extractor and connections through which the tar-freed moist gas flows directly into a compartment of the saturator, to effect absorption of ammonia from such gas; means for heating another compartment of the saturator, to cause the evaporation requisite to effect precipitation of ammonium sulfate; and devices for interchangeably connecting the different compartments of the saturator with the ammoniacal gas supply and the heating means respectively; substantially as specified.

6. In apparatus for the recovery of ammonium sulfate, in combination: a plurality of saturator compartments; a tar-extractor, and direct connections therefrom to each saturator compartment; a preheater, and connections thereto and therefrom for each saturator compartment; and means for permitting interchangeable opening and closing of the connections of each saturator compartment with the ammoniacal gas supply and the preheater respectively, whereby the compartments may be interchangeably employed for the absorption of ammonia from the ammoniacal gas and for the heating of the saturation-bath to effect the precipitation of ammonium sulfate; substantially as specified.

7. In apparatus for the recovery of ammonium sulfate, in combination: a plurality of saturator compartments; a tar-extractor, and direct connections therefrom to each saturator compartment; heating means and connections therewith for each saturator compartment; and devices for permitting interchangeable opening and closing of the connections of each saturator compartment with the ammoniacal gas supply and the heating means respectively, whereby the compartments may be interchangeably employed for the absorption of ammonia from the ammoniacal gas and for the heating of the saturation-bath to effect precipitation of ammonium sulfate; substantially as specified.

8. In apparatus for the recovery of ammonium sulfate, in combination: a plurality of saturator compartments; a tar-extractor, and direct connections therefrom to each saturator compartment; a preheater, and connections thereto and therefrom for each saturator compartment; means for permitting interchangeable opening and closing of the connections of each saturator compartment with the ammoniacal gas supply and the preheater respectively, whereby the compartments may be interchangeably employed for the absorption of ammonia from the ammoniacal gas and for the heating of the saturation-bath to effect the precipitation of ammonium sulfate; and valve-controlled by-pass connection between the preheater and the conduit for moist ammoniacal gas; substantially as specified.

9. In the recovery of ammonium sulfate: the process of directly passing the tar-freed moist gas through a portion of the saturation-bath, to effect absorption of the ammonia from such gas, and heating by a superheated portion of such gas another portion of the saturation-bath to cause the evaporation requisite to effect precipitation of the ammonium sulfate; substantially as specified.

10. In the recovery of ammonium sulfate: the process of directly passing the tar-freed moist gas through a portion of the saturation-bath, to effect absorption of the ammonia from such gas, and precipitating the ammonium sulfate in another portion of the saturation-bath, wholly by superheated lean gas, as the sole carrier for the requisite evaporation from the saturation-bath; substantially as specified.

11. In an apparatus for the recovery of ammonium sulfate; a compartmented saturator; an ammoniacal gas supply; and means for permitting interchangeable opening and closing of the compartments of said saturator individually or collectively with said ammoniacal gas supply; substantially as specified.

In testimony whereof I have hereunto set my hand in the presence of two subscribing witnesses.

JOSEPH BECKER.

Witnesses:
    Jos. Van Ackerman,
    Joseph Dvorak.